Dec. 15, 1942.   C. D. JACKSON   2,305,170
SAW MILL
Filed Oct. 6, 1941
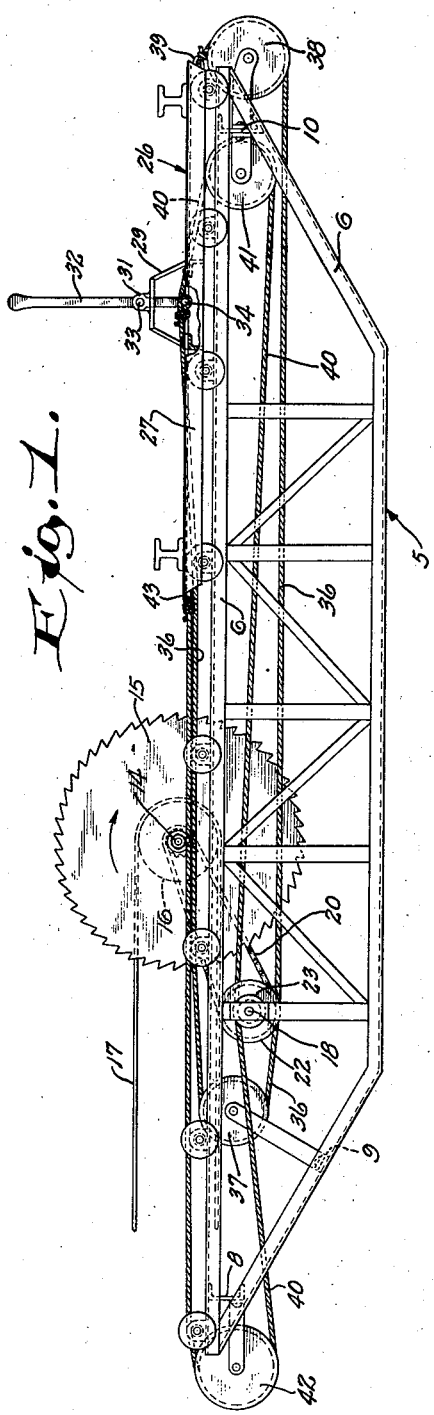
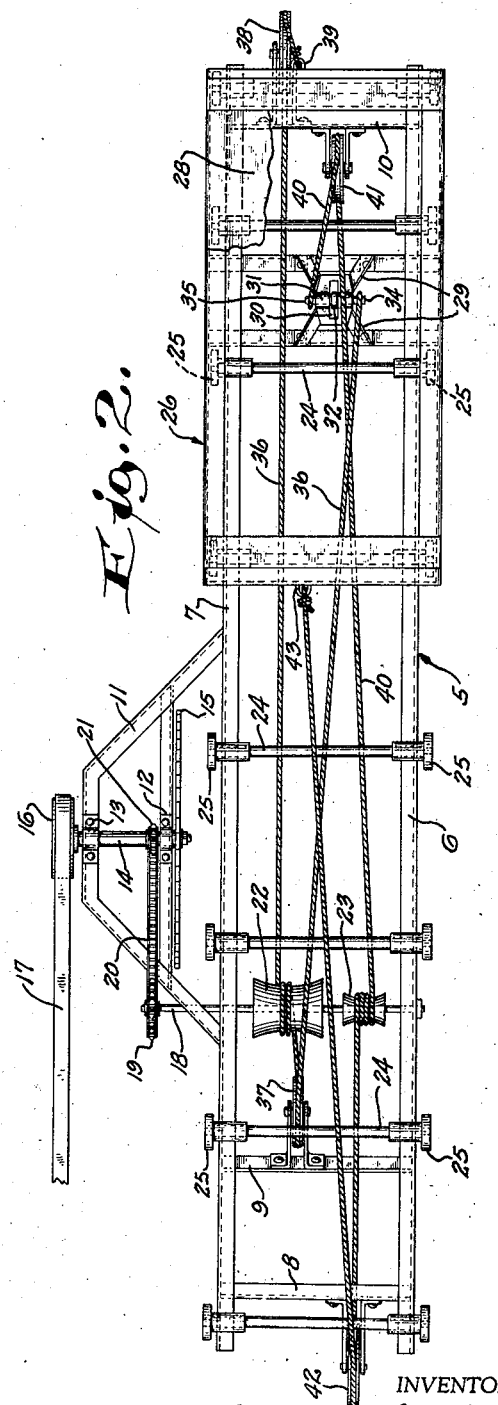
INVENTOR.
Clinton D. Jackson
BY
Morsell & Morsell
ATTORNEYS.

Patented Dec. 15, 1942

2,305,170

UNITED STATES PATENT OFFICE 2,305,170

SAWMILL

Clinton D. Jackson, Mondovi, Wis.

Application October 6, 1941, Serial No. 413,783

8 Claims. (Cl. 143—105)

This invention relates to improvements in saw mills and more particularly to a saw mill embodying improved mechanism for imparting and controlling the back and forth movement of the feed carriage.

Heretofore, in saw mills, it has been common practice to support the work on a suitable carriage which is moved in a forward direction to carry the work through the rotating saw and which is moved in a reverse direction to return the carriage to starting position. In order to impart the reciprocating movement to the carriage it has heretofore been necessary to utilize a complicated two-directional drive with clutching mechanism or shiftable friction disks controlling the reversing operation. These arrangements are expensive and have heretofore made it impractical to produce a saw mill embodying a reciprocating feed carriage at low cost.

It is a general object of the present invention to obviate the above objections by providing an improved saw mill wherein simplified mechanism is utilized for effecting back and forth movement of the feed carriage and for controlling the same.

A further object of the invention is to provide a device of the class described wherein a single drive shaft, which may be rotated continuously in one direction only by means common with the drive for the saw, is utilized to impart selective two-directional movement to the feed carriage.

A further object of the invention is to provide a saw mill as above described wherein the return movement of the carriage may be at a higher speed than the feed movement.

A still further object of the invention is to provide a construction wherein an operator riding on the carriage may control the back and forth feed movement from his position on said carriage.

A more specific object of the invention is to provide a construction wherein there may be two drums on the feed carriage drive shaft, preferably of different diameters, rotated continuously in the same direction and wherein cables cooperable with said drums are wrapped in opposite directions around their respective drums, said cables being operatively connected with the carriage and with a control lever in such a way as to provide for maintaining the carriage either in a position of rest or for movement in a desired direction according to the position of the lever.

With the above and other objects in view, the invention consists of the improved saw mill and all its parts and combinations as set forth in the claims, and all equivalents thereof.

In the accompanying drawing illustrating one complete embodiment of the preferred form of the invention, in which the same reference numerals designate the same parts in all of the views, Fig. 1 is a side elevational view of the improved saw mill, part of the feed carriage being broken away adjacent the lower end of the control lever; and Fig. 2 is a plan view of the saw mill with part of the platform on the feed carriage broken away.

Referring more particularly to the drawing, the numeral 5 designates a main frame which may comprise side sections 6 and 7 suitably connected in spaced-apart condition by transverse braces 8, 9, and 10.

Projecting laterally from the side 7 is an extension frame 11 which supports bearings 12 and 13 for the saw drive shaft 14. One end of the shaft 14 carries a rigidly mounted rotary saw 15, and the other end carries a pulley 16. The pulley 16 is connected by an endless belt with any suitable source of power, whereby the pulley 16, shaft 14, and saw belt 15 are rotated.

Journalled transversely of the frame 5 is a carriage drive shaft 18 which carries a sprocket wheel 19 on its outer end. The sprocket 19 may be connected by an endless chain 20 with a sprocket wheel 21 mounted rigidly on the drive shaft 14 for the saw. The saw is continuously rotated in the direction indicated by the arrow in Fig. 1, and the feed carriage drive shaft 18 is continuously rotated in the same direction.

Mounted rigidly on the drive shaft 18 are drums 22 and 23. These drums preferably have concave peripheries as illustrated, but may however be of conventional form. It is preferred that the drum 22 be of larger diameter than the drum 23 for a purpose to be hereinafter described. This, however, is not essential, and the drums may be of the same diameter or a single drum of extra length which may or may not have portions of different diameters may be utilized in lieu of the two spaced drums.

The upper rails of the side sections 5 and 7 of the main frame are also connected by a series of transverse shafts 24, and the outer ends of these shafts carry rollers 25. A feed carriage 26 having depending side flanges 27 embracing the rollers 25 is movable over said rollers longitudinally of the main frame 5. The feed carriage may embody a platform 28 on which an operator may stand, and supports the upstanding bracket assembly 29. The bracket assembly 29 has a central slot 30 and spaced bearing portions 31. A control lever 32 is fulcrumed on a pin 33 extending through the bearings 31, and the lower end of the control lever carries a transverse cable attachment arm which has an end 34 projecting in one direction and an end 35 projecting in the opposite direction.

The end 34 has one end of a cable 36 attached thereto, and said cable extends beneath the carriage and around a pulley 37 which is suitably supported for rotation on the transverse brace 9. From the lower side of the pulley 37 the cable passes under the drum 22 and is wrapped a desired number of times around said drum. From the drum 22 the cable 36 extends around a pulley 38 suitably supported on the transverse brace 10, and the cable is then connected to the rear end of the feed carriage as at 39.

The other end 35 of the control lever cable arm has one end of a second cable 40 connected thereto. This cable passes around a pulley 41 which is suitably supported for rotation on the transverse brace 10. From the lower side of the pulley 41 the cable 40 extends to the upper side of the drum 23 and is wrapped around the drum 23 a desired number of times. From the drum 23 the cable 40 passes to the under side of a pulley 42 suitably suported for rotation on the brace 8. The cable 40 then extends from the upper side of the pulley 42 to the front end of the carriage where it is connected as at 43. It is to be noted that the cables 36 and 40 are wrapped in reverse directions around their respective drums.

When the control lever 32 is in the vertical position of Fig. 1 the wrappings of the cables 36 and 40 around the drums 22 and 23 are sufficiently loose to permit the drums to rotate inside of the wrappings without exerting any pull on the cables. By being wrapped in reverse directions the friction between the wrappings on one drum offsets the friction between the wrappings on the other drum; thus the carriage is maintained in a stationary condition when the control lever is in the position of Fig. 1.

When it is desired to move the carriage toward the saw, the saw and drum shaft 18 being continuously rotated when the device is in use, then an operator standing on the platform 28 of the feed carriage moves the top of the lever 32 away from the saw. This causes the lower end of the control lever to be moved toward the saw, with a resulting slackening of the cable 36 which cooperates with the drum 22, and with a resulting tightening of the cable 40. This brings the wrappings of the cable 40 around the drum 23 into driving engagement with the drum so that a pull is exerted on the carriage at a point 43 to move the carriage forward toward the saw.

After the carriage has carried the work supported thereon through the saw, then to cause return movement of the carriage the upper end of the control lever is pushed in a forward direction toward the saw. This moves the lower end of the control lever away from the saw and causes slackening of the cable 40 and tightening of the cable 36. The tightening of the cable 36 causes driving engagement of the wrappings thereof with the drum 22, with the resulting pull on the rear end of the carriage at point 39 to return the carriage to its original position. Due to the large diameter of the drum 22 with respect to the diameter of the drum 23, the return movement is at a higher speed than the feed movement. If such increased speed is not desired the drums can, of course, be made of the same size.

In order to stop the carriage at the end of its return movement the control lever is again placed in the neutral position of Fig. 1.

From the above it is apparent that a carriage drive shaft driven continuously in only one direction with the saw is utilized in a simple manner to provide two-directional feed movement for the carriage. It is also apparent that change in direction may be controlled in a simple manner by an operator riding on the carriage. The increased speed for the return movement is also accomplished in a simple manner, and this increased speed is desirable in order to increase the production capacity of the saw mill.

It is to be noted that there are less wrappings around the drum 22 than around the drum 23. The difference between the number of wrappings is approximately inversely proportional to the difference in the diameters of the drums so that when the control lever 32 is in neutral position, the limited friction between the loose wrappings on one drum will approximately counteract the limited friction between the loose wrappings on the other drum. Thus there will be no tendency for undesired carriage movement in one direction or the other when the lever is in neutral position.

Although only one form of the invention has been shown and described, it is obvious that various changes and modifications may be made without departing from the spirit of the invention, and all of such changes are contemplated as may come within the scope of the claims.

I claim:

1. In a saw mill or the like having a frame, a saw, a feed carriage movably mounted on said frame for movement toward and away from said saw, rotatable drum means in longitudinally fixed position on the frame, a common means for rotating said saw and drum means in the same direction at different speeds, a cable normally loosely wrapped around said drum means and operatively connected to said carriage to move the latter in one direction, a second cable normally loosely wrapped in the opposite direction from said first cable around said drum means and operatively connected to said carriage to move the latter in the opposite direction, and means on the carriage for causing driving engagement of a selected cable wrapping with said drum means on the frame.

2. In a saw mill or the like having a frame, a saw, a feed carriage movably mounted on said frame for movement toward and away from said saw, rotatable drum means in longitudinally fixed position on the frame, a cable normally loosely wrapped around said drum means and operatively connected to said carriage to move the latter in one direction, a second cable normally loosely wrapped in the opposite direction to said first cable around said drum means and operatively connected to said carriage to move the latter in the opposite direction, and means on the carriage for causing driving engagement of a selected cable wrapping with said drum means on the frame.

3. In a saw mill or the like having a frame, a saw, a feed carriage movably mounted on said frame for movement toward and away from said saw, a rotatable drive shaft journalled in said frame, drum means rigidly mounted on said shaft, common means for rotating said saw and drive shaft in the same direction and at different speeds, a cable normally loosely wrapped around said drum means and operatively connected to said carriage to move the latter in one direction, a second cable normally loosely wrapped in the opposite direction from said first cable around said drum means and operatively connected to said carriage to move the latter in the opposite direction, and means on the carriage for causing tightening of a selected cable wrapping on said drum means on the frame.

4. In a saw mill or the like having a frame, a saw, a feed carriage movably mounted on said frame for movement toward and away from said saw, a rotatable drive shaft journalled in said frame, a first drum rigidly mounted on said shaft, a second drum of smaller diameter than said first drum rigidly mounted on said shaft, a cable normally loosely wrapped around said smaller drum and operatively connected with said carriage to move the latter in a feeding direction, a second cable normally loosely wrapped in the opposite direction from said first cable around said larger drum and operatively connected to said carriage to move the latter in a return direction, and means on the carriage for causing driving engagement of a selected cable wrapping with its respective drum on the frame, the number of wrappings on the smaller drum being greater than the number of wrappings on the larger drum and being approximately inversely proportional to the difference in the diameters of the drums.

5. In a saw mill or the like having a frame, cable guiding means near each end of the frame, a saw mounted on the frame, a feed carriage movably mounted on the frame for movement toward and away from said saw, a control lever on said feed carriage, rotatably driven drum means on said frame, a cable having one end secured to the carriage and having an intermediate portion wound around said drum means, said cable also extending around the guiding means at both ends of the frame with the second end of said cable connected to said control lever on the carriage, a second cable having one end secured to the carriage and extending from the opposite end of the carriage from the secured end of the first cable, said second cable being wound in a reverse direction around said drum means from the direction of winding of the first cable, and also extending around the guiding means at both ends of the frame, the second end of said second cable being connected to said control lever, said control lever being movable to cause tightening of a selected one of the cables on its drum means and to cause simultaneous loosening of the other cable.

6. In a saw mill or the like having a frame, cable guiding means near each end of the frame, a saw rotatably mounted on the frame, a feed carriage movably mounted on the frame for movement toward and away from said saw, a control lever on said feed carriage, a rotatable shaft journalled in said frame, drum means rigidly mounted on said shaft, common driving means for said saw and drum shaft including mechanism for driving the saw at a higher speed than the drum shaft, a cable having one end secured to the carriage and having an intermediate portion wound around said drum means, said cable also extending around the guiding means at both ends of the frame with the second end of said cable connected to said control lever on the carriage, a second cable having one end secured to the carriage and extending from the opposite end of the carriage from the secured end of the first cable, said second cable being wound in a reverse direction around said drum means from the direction of winding of the first cable, and also extending around the guiding means at both ends of the frame, the second end of said second cable being connected to said control lever, said control lever being movable to cause tightening of a selected one of the cables on its drum means and to cause simultaneous loosening of the other cable.

7. In a saw mill or the like having a frame, cable guiding means near each end of the frame, a saw mounted on the frame, a feed carriage movably mounted on the frame for movement toward and away from said saw, a control lever on said feed carriage, a rotatably driven shaft, two drums rigidly mounted on said shaft, each drum having a periphery which is concave in longitudinal section, a cable having one end secured to the carriage and having an intermediate portion wound around one of said drums, said cable also extending around the guiding means at both ends of the frame with the second end of said cable connected to said control lever, a second cable having one end secured to the carriage and extending from the opposite end of the carriage from the secured end of the first cable, said second cable being wound around the other drum in a reverse direction from the direction of winding of the first cable, and said second cable also extending around the guiding means at both ends of the frame, the second end of said second cable being connected to said control lever, said control lever being operable to cause tightening of a selected one of the cables on its drum and to cause simultaneous loosening of the other cable on the other drum.

8. In a saw mill or the like having a frame, cable guiding means near each end of the frame, a saw mounted on the frame, a feed carriage movably mounted on the frame for movement toward and away from said saw, a control lever pivotally connected at a point intermediate the length of said lever to said carriage to pivot in a vertical plane extending substantially longitudinally of the carriage, rotatably driven drum means on said frame, a cable having one end secured to the carriage and having an intermediate portion wound around said drum means, said cable also extending around the guiding means at both ends of the frame with the second end of the cable connected to a swingable portion of said control lever, a second cable having one end secured to the carriage and extending from the opposite end of the carriage from the secured end of the first cable, said second cable being wound in a reverse direction around said drum means from the direction of wind for the first cable and also extending around the guiding means at both ends of the frame, the second end of said second cable being connected to the same swingable portion of the control lever as the first cable, said control lever being operable to cause tightening of a selected one of the cables on its drum means and to cause simultaneous loosening of the other cable.

CLINTON D. JACKSON.